(12) United States Patent
Bae et al.

(10) Patent No.: US 7,842,345 B2
(45) Date of Patent: Nov. 30, 2010

(54) INKJET METHOD AND APPARATUS FOR PRINTING AN ALIGNMENT LAYER

(75) Inventors: Jong-Sung Bae, Busan-si (KR); Jin-Soo Jung, Goyang-si (KR); Doo-Han Chung, Yongin-si (KR); Min-Young Won, Yongin-si (KR); Kun-Jong Lee, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 328 days.

(21) Appl. No.: 11/179,741

(22) Filed: Jul. 12, 2005

(65) Prior Publication Data

US 2006/0127580 A1    Jun. 15, 2006

(30) Foreign Application Priority Data

Dec. 13, 2004    (KR) ...................... 10-2004-0104931

(51) Int. Cl.
*B05D 1/36* (2006.01)
*B41J 2/01* (2006.01)

(52) U.S. Cl. .................. 427/261; 427/286; 427/425

(58) Field of Classification Search ............. 427/261, 427/265, 286, 424, 425, 427.3; 347/1, 4, 347/9, 16, 37–40, 104; 118/313–315, 320–322; 349/94, 123, 129, 130, 132; 428/1.1, 1.2, 428/1.21
See application file for complete search history.

(56) References Cited

U.S. PATENT DOCUMENTS

| | | | | |
|---|---|---|---|---|
| 5,473,351 A | * | 12/1995 | Helterline et al. | ............. 347/19 |
| 6,341,840 B1 | * | 1/2002 | van Doorn et al. | ............ 347/41 |
| 6,842,217 B1 | * | 1/2005 | Miller et al. | ................ 349/198 |
| 2004/0169802 A1 | * | 9/2004 | Yun et al. | .................... 349/123 |
| 2004/0196349 A1 | * | 10/2004 | Yun et al. | .................... 347/104 |
| 2005/0243112 A1 | * | 11/2005 | Kobayashi et al. | ............ 347/12 |

FOREIGN PATENT DOCUMENTS

| | | |
|---|---|---|
| CN | 1548294 A | 11/2004 |
| EP | 1 176 802 A2 * | 1/2002 |
| JP | 2004-362818 | 12/2004 |
| WO | WO 03/007398 A1 * | 1/2003 |

* cited by examiner

*Primary Examiner*—William Phillip Fletcher, III
(74) *Attorney, Agent, or Firm*—Innovation Counsel LLP (57) ABSTRACT

An inkjet method of printing an alignment layer is presented. The method entails depositing drops of an alignment liquid on a substrate while moving a plurality of inkjet heads and/or the substrate relative to each other to form a first dropping line on the substrate. The method also entails rotating a printing stage on which the substrate is mounted, and depositing drops of the alignment liquid on the substrate after forming the fist dropping line to form a second dropping line. Since the printing stage is elevated and rotated, the drops of the alignment liquid are easily deposited in a grid pattern to decrease the space between adjacent drops. If desired, drops may be skipped to avoid depositing the alignment liquid multiple times on the same location on the substrate. With this method, the planarization time of the alignment layers is shortened.

10 Claims, 12 Drawing Sheets

INKJET METHOD AND APPARATUS FOR PRINTING AN ALIGNMENT LAYER

RELATED APPLICATION

This application claims priority from Korean Patent Application No. 10-2004-0104931 filed on Dec. 13, 2004, the content of which is incorporated by reference herein in its entirety.

BACKGROUND OF THE INVENTION (a) Field of the Invention

The present invention relates to an inkjet alignment layer printing apparatus and a printing method of the alignment layer.

(b) Description of Related Art

A liquid crystal display (LCD) is a widely-used flat panel display that includes a pair of panels provided with field generating electrodes and a liquid crystal (LC) layer having dielectric anisotropy that is disposed between the two panels. Each panel includes an alignment layer.

The field generating electrodes generally include a plurality of pixel electrodes connected to switching elements such as thin film transistors (TFTs) to be supplied with data voltages and a common electrode covering an entire surface of a panel and supplied with a common voltage. A pair of field generating electrodes that generate the electric field in cooperation with each other and an LC disposed therebetween is called an LC capacitor.

Voltages are applied to the field generating electrodes to generate an electric field in the LC layer, and the strength of the electric field can be controlled by adjusting the voltage across the LC capacitor. Since the electric field determines the orientations of LC molecules and the molecular orientations determine the transmittance of light passing through the LC layer, the light transmittance is adjusted by controlling the applied voltages. By adjusting the light transmittance, the desired images are obtained.

The alignment layers are formed on a side of the panels adjacent to the LC layer to define the initial alignment of the LC molecules, by spin coating or flexo printing.

An alignment layer printing apparatus for forming the alignment layers using flexo printing includes a plurality of rolls such as an anilox roll and a printing roll engaged with each other, and plates made of a rubber and attached to the rolls. However, as the size of the panels and mother substrates for making the panels become larger, the size and the weight of the rolls and the plates increase, making the manufacturing of the alignment layer printing apparatus difficult.

SUMMARY OF THE INVENTION

A motivation of the present invention is to solve the problems of conventional techniques.

In one aspect, the invention is an inkjet alignment liquid printing apparatus that includes a plurality of inkjet heads injecting an alignment liquid onto a substrate. The substrate is mounted on a printing stage, wherein a portion of the printing stage is elevated and rotated.

In another aspect, the invention is an inkjet alignment layer printing method. The method includes depositing drops of an alignment liquid on a substrate by moving a plurality of inkjet heads and the substrate relative to each other to form a first dropping line. The substrate is mounted on a printing stage that is rotated, and drops of the alignment liquid is deposited on the substrate after forming the first dropping line to form a second dropping line.

BRIEF DESCRIPTION OF THE DRAWINGS

The present invention will become more apparent by describing preferred embodiments thereof in detail with reference to the accompanying drawings, in which.

DETAILED DESCRIPTION OF EMBODIMENTS

The present invention will be described more fully hereinafter with reference to the accompanying drawings, in which preferred embodiments of the invention are shown. This invention may, however, be embodied in many different forms and should not be construed as limited to the embodiments set forth herein.

In the drawings, the thickness of layers and regions are exaggerated for clarity. Like numerals refer to like elements throughout. It will be understood that when an element such as a layer, film, region, substrate, or panel is referred to as being "on" another element, it can be directly on the other element or intervening elements may also be present. In contrast, when an element is referred to as being "directly on" another element, there are no intervening elements present.

Inkjet alignment layer printing apparatuses and printing methods of an alignment layer according to embodiments of the present invention will now be described with reference to the drawings.

Figure 1:
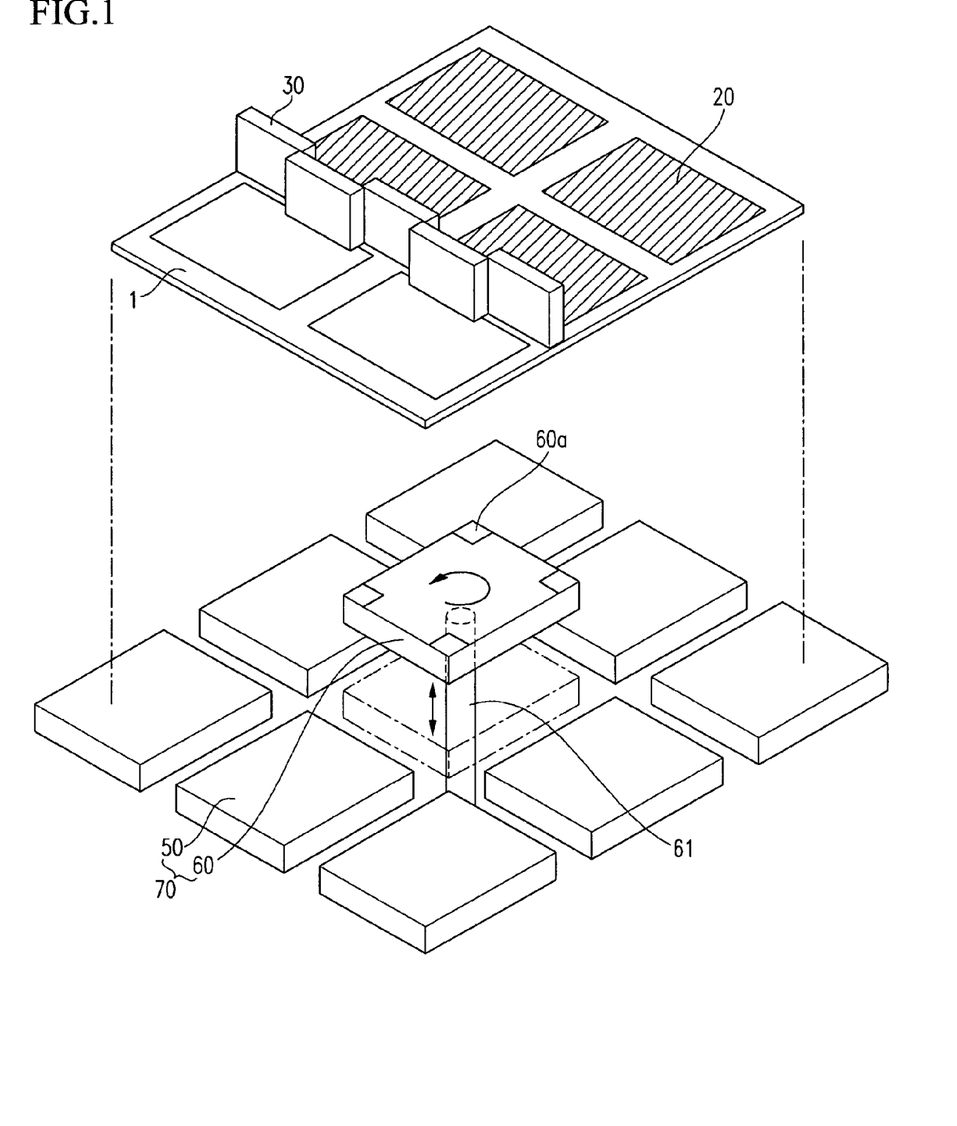
FIG. 1 is a perspective view of an inkjet alignment layer printing device according to an embodiment of the present invention.

FIG. 1 is a perspective view of an inkjet alignment layer printing device according to an embodiment of the present invention. FIGS. 2A and 3 to 6A sequentially illustrate a printing method for printing an alignment layer using an inkjet alignment layer printing device according to an embodiment of the present invention. FIG. 2B illustrates the states of the alignment liquid dropped on a substrate. FIG. 2C illustrates inkjet heads and a plurality of nozzle holes of an inkjet alignment layer printing device according to an embodiment of the present invention. FIG. 6B illustrates the alignment liquid dropped on a substrate after rotating the substrate.

Referring to FIG. 1, an inkjet alignment layer printing apparatus includes a plurality of inkjet heads 30 injecting an alignment liquid on a substrate 1, and a printing stage 70 on which the substrate 1 is mounted. A plurality of alignment layers 20 are printed on the substrate 1.

The printing stage 70 includes a plurality of supporting stages 50 supporting the substrate 1 and a transporting stage 60 surrounding the supporting stages 50. The transporting stage 60 is capable of being elevated and rotated. Preferably, the printing stage 70 includes a vacuum chuck for fixing the mounted substrate 1 in place.

The supporting stages 50 may have rectangular shapes and are spaced at predetermined intervals. A conveying arm (not shown) passes through the spaces between the adjacent supporting stages 70 and moves the substrate 1.

The transporting stage 60, which may also have a rectangular shape, includes a supporting bar 61 disposed on a lower part thereof, to elevate and rotate the transporting stage 60. The supporting bar 61 is made to elevate and rotate by an installed driving device such as a motor and gears.

A plurality of adhesive films 60a are formed on the corners of the rectangular-shaped transporting stage 60. Preferably, the adhesive films 60a are made of viscous materials to prevent the movement of the substrate 1 when rotating the substrate 1 using the transporting stage 60.

As shown in FIG. 2C, the inkjet heads 30 are disposed in a staggered arrangement with a predetermined amount of overlapping between the neighboring inkjet heads 30. Since there are multiple inkjet heads 30, the alignment layers 20 are easily formed into various shapes in accordance with the size of the substrate 1.

A plurality of nozzle holes h1-h4 are formed on a lower part of the respective inkjet heads 30. The neighboring inkjet heads 30 overlap each other such that the interval d' between the nozzle holes h1-h4 is constant. If the inkjet heads 30 were not overlapped, the interval between the nozzle holes 31a across neighboring inkjet heads 30 would be greater than the intervals between the nozzle holes 31a in one inkjet head 30 A plurality of piezoelectric actuators are formed on areas corresponding to the nozzle holes h1-h4 of each inkjet head 30. When a current flows through each piezoelectric actuator, the piezoelectric actuator pushes the alignment liquid to inject the alignment liquid through the corresponding nozzle hole h1-h4.

The alignment layers 20 are formed into shapes corresponding to a plurality of patterns formed on the substrate 1 by moving the inkjet heads 30 or the printing stage 70.

Rolls and rubber plates are unnecessary in forming the alignment layers 20 by the above-described inkjet printing apparatus. Thus, the size of the printing apparatus becomes small and various printing patterns may be formed by controlling the software and so on. Thus, the size and the weight of the rolls and rubber plates of the prior art that increase as the substrate becomes larger is not a factor to consider.

Now, a manufacturing method of an LCD using an inkjet printing apparatus according to an embodiment of the present invention will be described in detail.

Figure 2A:
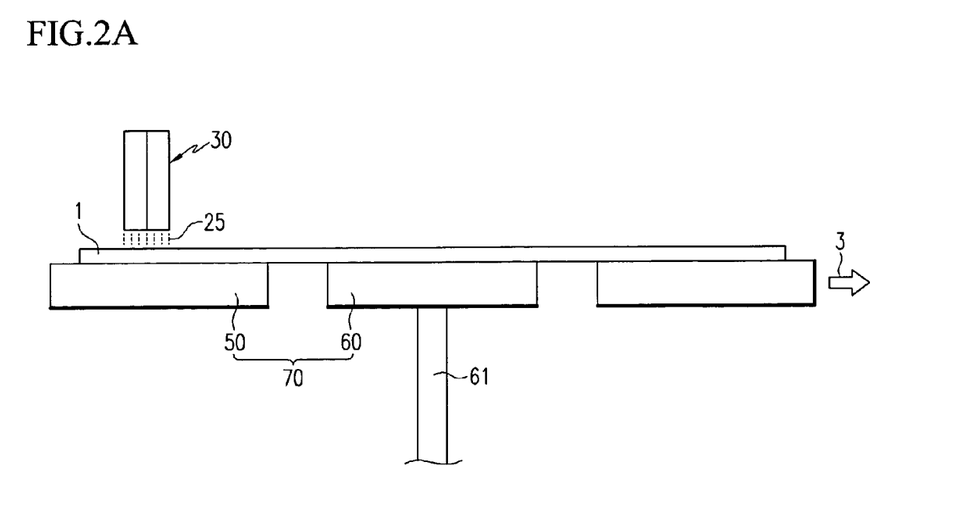
FIGS. 2A, 3, 4, 5, and 6A sequentially illustrate a printing method for printing an alignment layer using an inkjet alignment layer printing device according to an embodiment of the present invention.
Figure 2B:
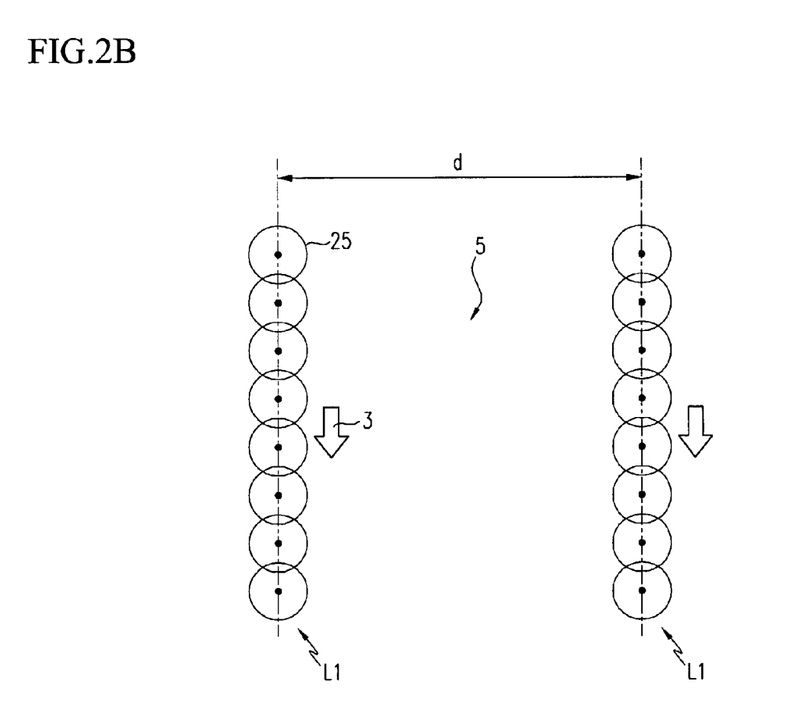
FIG. 2B illustrates the alignment liquid dropped on a substrate.
Figure 2C:
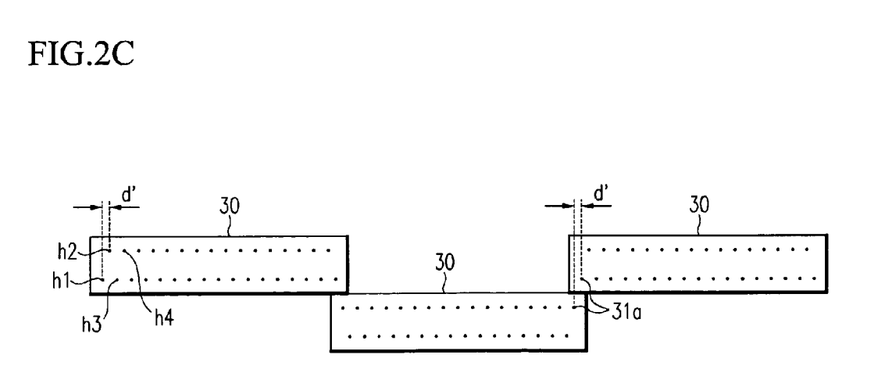
FIG. 2C illustrates inkjet heads and a plurality of nozzle holes of an inkjet alignment layer printing device according to an embodiment of the present invention.

As shown in FIGS. 2A and 2B, by moving the printing stage 70 disposed under the inkjet heads 30 in the direction shown by an arrow 3, a plurality of drops 25 of alignment liquid are dropped on the substrate 1, to form first dropping lines L1. The alignment liquid drops 25 are dropped with a diameter equal to that of the corresponding nozzle hole h1-h4 on the substrate 1. At this time, the interval "d" between the adjacent first dropping lines L1 is substantially equal to the interval "d" between the adjacent nozzle holes h1-h4. The space 5 is formed between the alignment liquid drops 25.

Since the interval d' between the drops 25 can be adjusted by varying the moving speed of the printing stage 70, but the interval d between the first dropping lines L1 is fixed and is far wider than the diameter of the alignment liquid drop 25, planarization of the alignment layers 20 is difficult.

For decreasing the interval d between the first dropping lines L1, it is important for the substrate 1 to have good surface characteristics before the dropping of the alignment liquid by decreasing consistency of the alignment liquid or improving cleansing conditions. However, the manufacturing processes then become complicated and the selection of the alignment liquid is more difficult.

Another way for decreasing the interval d is to decrease the interval d' between the nozzle holes h1-h4. However, the extent to which the interval d' can be decreased is limited due to the piezoelectric actuator disposed on the nozzle hole and an alignment liquid storage tank.

Yet another way for decreasing the interval d is to use two groups of the inkjet heads in a crisscross arrangement at a predetermined distance in two lines or one group of the inkjet heads that are capable of shifting in a horizontal direction. However, either of these methods would increase manufacturing cost and tack time of the alignment forming process.

In an embodiment of the present invention, a moving unit that is capable of elevating and rotating is used to adjust the position of the substrate 1 and drop the alignment liquid. Using this moving unit, drops of alignment liquid are deposited in a grid pattern to form even alignment layers.

Figure 3:
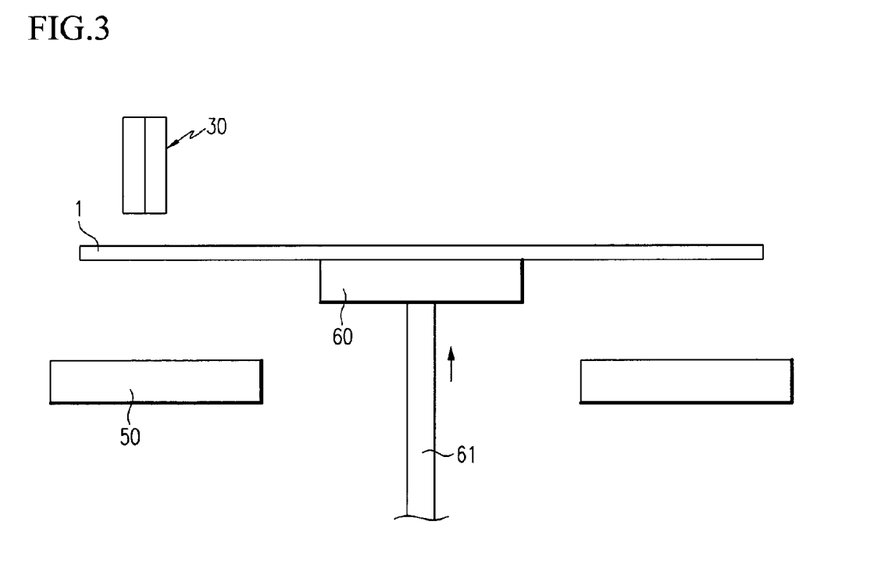

As shown in FIG. 3, the transporting stage 60 is elevated, and the substrate 1 mounted on the transporting stage 60 is elevated as well.

Figure 4:
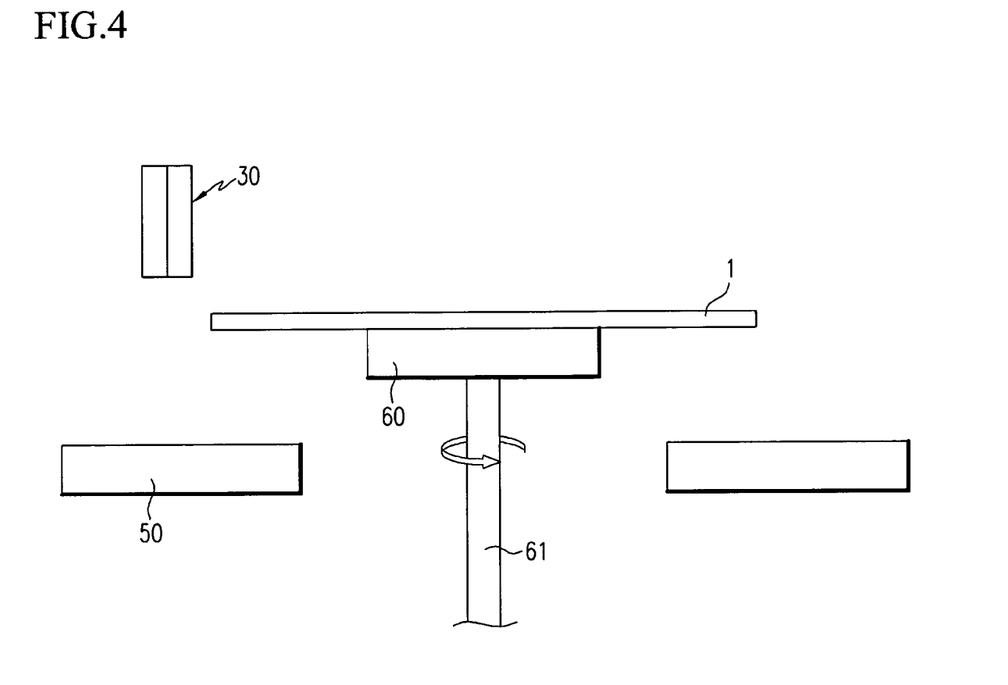

As shown in FIG. 4, the transporting stage 60 is rotated to rotate the substrate 1 mounted on the transporting stage 60. Preferably, the substrate 1 is rotated by about 90°.

Figure 5:
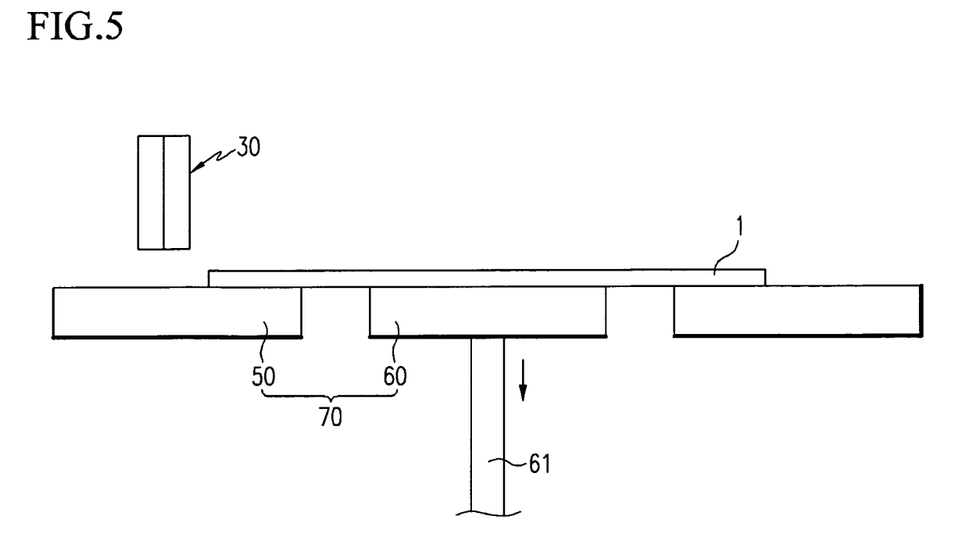

As shown in FIG. 5, the substrate 1 mounted on the transporting stage 60 is lowered and placed on the supporting stage 50 when the transporting stage 60 is lowered.

Figure 6A:
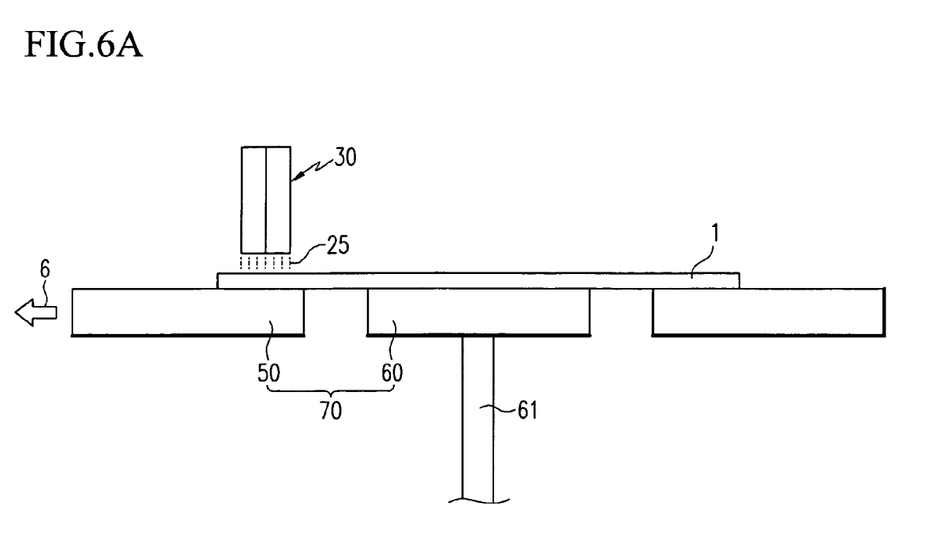
Figure 6B:
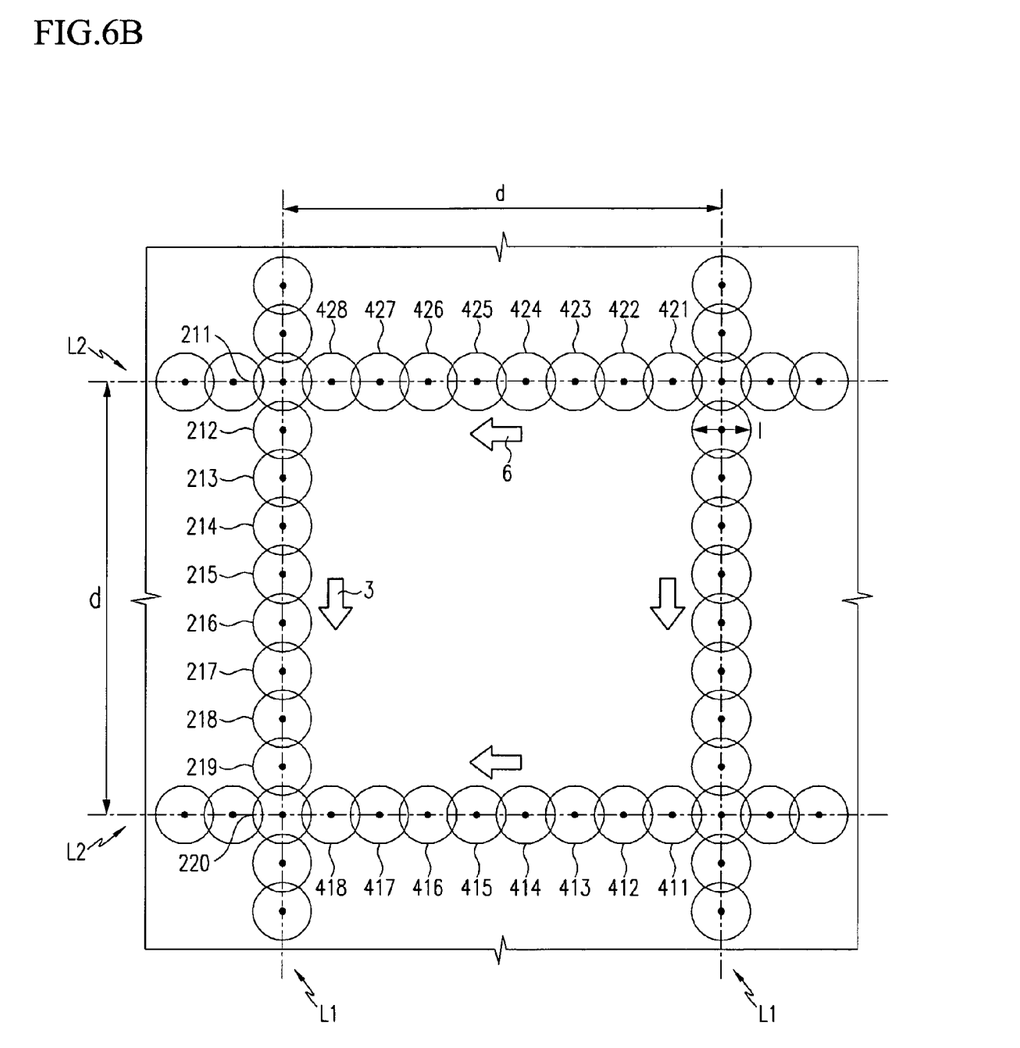
FIG. 6B illustrates the alignment liquid dropped on a substrate after rotating the substrate.

Next, as shown in FIG. 6A, the printing stage 70 disposed under the inkjet heads 30 is moved again and the drops 25 of the alignment liquid are dropped to form the second dropping lines L2. The alignment liquid drops 25 are deposited on the substrate 1 with a diameter equal to that of the corresponding nozzle hole, and the second dropping lines L2 are formed at the interval d that is substantially equal to the interval d" between the adjacent nozzle holes h1-h4.

In this case, the second dropping lines L2 are perpendicular to the first dropping lines L1 already formed on the substrate 1 so that a dropping pattern of the alignment liquid drops 25 forms a grid. Thus, by aligning the liquid drops 25 around the space 5 into the lines L1 and L2, the length of time that is needed for realizing the planarization of the alignment layers 20 is shortened.

The shapes of voltage pulses applied to the nozzle holes h1-h4, or to the piezoelectric actuators, of the inkjet heads 30 for depositing the alignment liquid drops 25 are varied to more easily realize the planarization of the alignment layers 20.

Figure 7A:
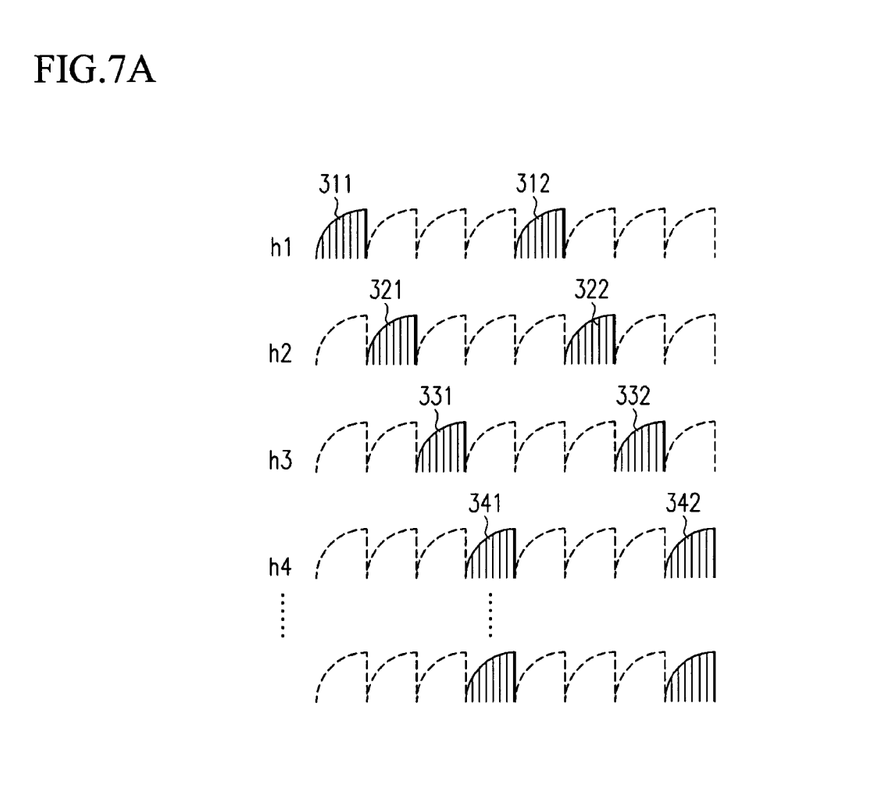
FIG. 7A illustrates first voltage pulses applied to a plurality of nozzle holes for forming a plurality of first dropping lines, respectively.
Figure 7B:
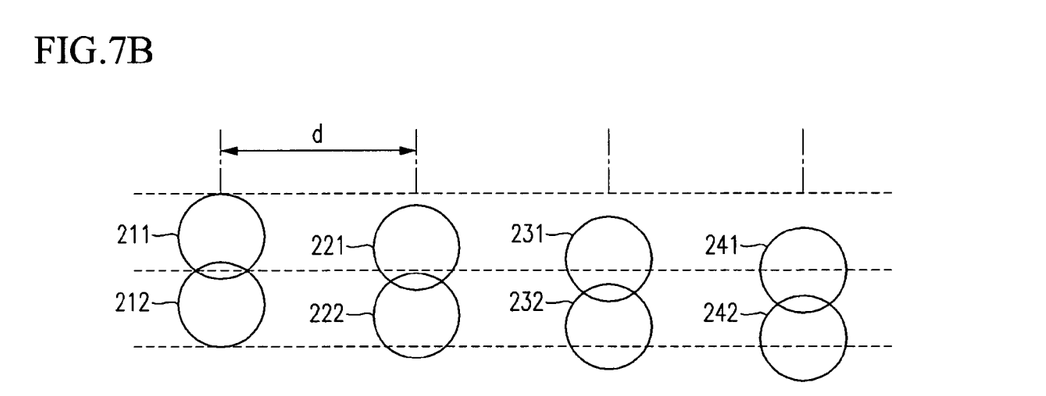
FIG. 7B illustrates drops of alignment liquid deposited according to the first voltage pulses shown in FIG. 7A.

FIG. 7A illustrates first voltage pulses applied to a plurality of nozzle holes for forming a plurality of first dropping lines, and FIG. 7B illustrates the drops of alignment liquid that are deposited by the first voltage pulses shown in FIG. 7A.

In FIGS. 7A and 7B, the hatched voltage pulses are actually applied to the piezoelectric actuators for forming the alignment layers 20. The dotted pulses are for indicating the interval between adjacent voltage pulses that are actually applied. As shown in FIGS. 7A and 7B, voltage pulses 311 and 312 are generated to be sequentially applied to the first nozzle hole h1 of the inkjet head 30, and drops 211 and 212 of the alignment liquid are dropped on the same line. The drops 211 and 212 overlap each other in a predetermined manner.

Voltage pulses 321 and 322 are generated to be sequentially applied to the second nozzle hole h2 while maintaining a predetermined interval with the voltage pulses 311 and 312 applied to the first nozzle hole h1. That is, the voltage pulses 321 and 322 are delayed by a predetermined time from the voltage pulses 311 and 312, respectively. Thus, the interval between the drops 211 and 212 deposited by the first nozzle hole h1 and the drops 221 and 222 deposited by the second nozzle hole h2 maintain the interval d. At this time, the drops 211 and 212 are dropped on the same line and are overlapped with each other by a predetermined portion.

By maintaining the predetermined interval between the voltage pulses 311 and 312 applied to the first nozzle hole h1 and the voltage pulses 321 and 322 applied to the second nozzle hole h2, space areas between the alignment liquid drops 25 of circular shapes decrease and the spread speed of the drops 25 is accelerated.

Drops 231 and 232 by voltage pulses 331 and 332 applied to a third nozzle hole h3 and drops 241 and 242 by voltage pulses 341 and 342 applied to a fourth nozzle hole h4 are also to the same as the drops 211, 212, 221, and 222.

If the first voltage pulses for forming the first dropping lines L1 are the same as those for forming the second dropping lines L2, the first dropping lines L1 overlap the second dropping lines L2 when the second dropping lines L2 are formed. For example, in FIG. 6b, the drops 211 and 220 are firstly dropped when the first dropping lines L1 are formed, and they 211 and 220 are secondly dropped at the same position that the drops 211 and 220 were already dropped when the second dropping lines L2 are formed.

Figure 8A:
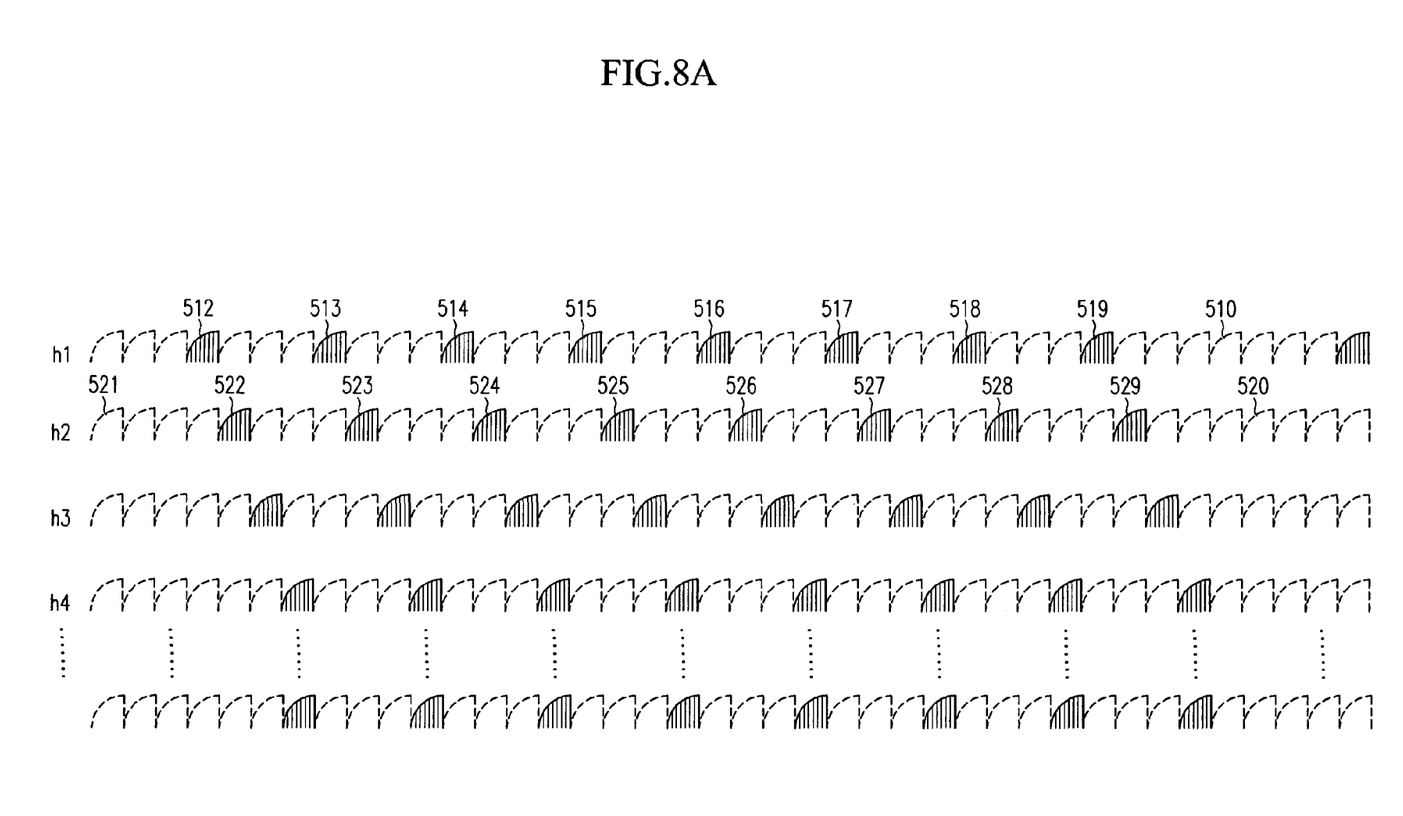
FIG. 8A illustrates second voltage pulses applied to a plurality of nozzle holes for forming a plurality of second dropping lines, respectively.

To remove the overlapped areas between the first dropping lines L1 and the second dropping lines L2, it is preferable to apply voltage pulses having a predetermined period as shown in FIG. 8A to the nozzle holes h1-h4, that is, the piezoelectric actuators, of the inkjet heads 30.

Figure 8B:
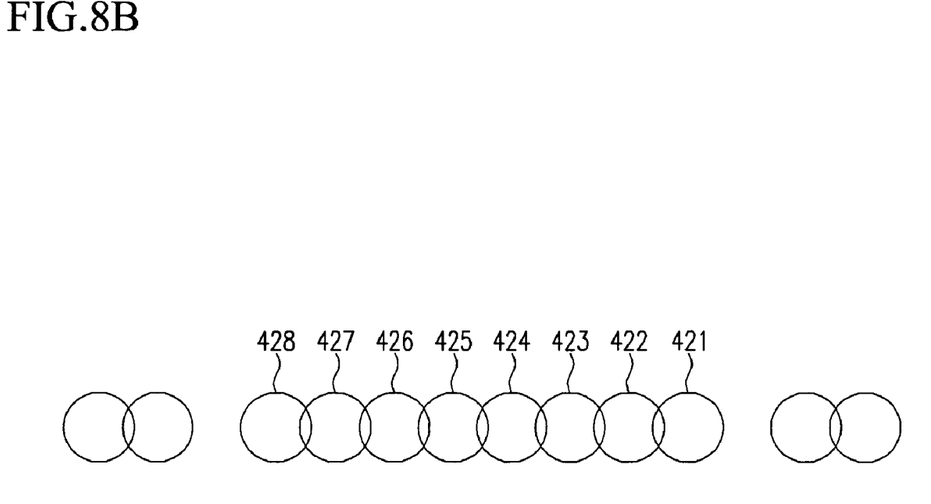
FIG. 8B illustrates drops of alignment liquid deposited according to the second voltage pulses shown in FIG. 8A.

FIG. 8A illustrates second voltage pulses applied to a plurality of nozzle holes for forming a plurality of second dropping lines, respectively, and FIG. 8B illustrates drops of alignment liquid dropped by the second voltage pulses shown in FIG. 8A.

As shown in FIG. 8A, the period of the second voltage pulse is equal to that of the first voltage pulse, but the second voltage pulse is not generated at times 510, 520, and 521 which is when the ninth pulse is to be generated. On portions of the second dropping line L2 that overlap the first dropping line L1 already formed by the first voltage pulse, there is no pulse for forming the second dropping line L2. For all the other portions, the second voltage pulse period is equal to the first voltage pulse period.

In this case, as shown in FIGS. 6B and 8B, eight drops 421-428 of the alignment liquid are sequentially dropped to be overlapped adjacent and along the second dropping line L2, and eight drops are sequentially dropped again after a predetermined time period to form the next second dropping line L2.

FIG. 6B shows two of the first dropping lines L1 and two of the second dropping lines L2 for clarity of illustration. However, the invention is not limited to this particular arrangement.

When the alignment liquid drops 421-428 and 411-418 are deposited along the respective second dropping lines L2 after the alignment liquid drops 211-220 are deposited along the first dropping line L1, the alignment liquid is not dropped on the portions 211 and 220 on the second dropping lines L2 that overlap the first dropping lines L1. Thus, the alignment liquid is conserved and the alignment liquid is uniformly deposited.

For forming the alignment layers, the period, the number, and the shape of a voltage pulse applied to each nozzle hole may be varied to change the arrangement of the alignment liquid drops deposited on the substrate.

Figure 9A:
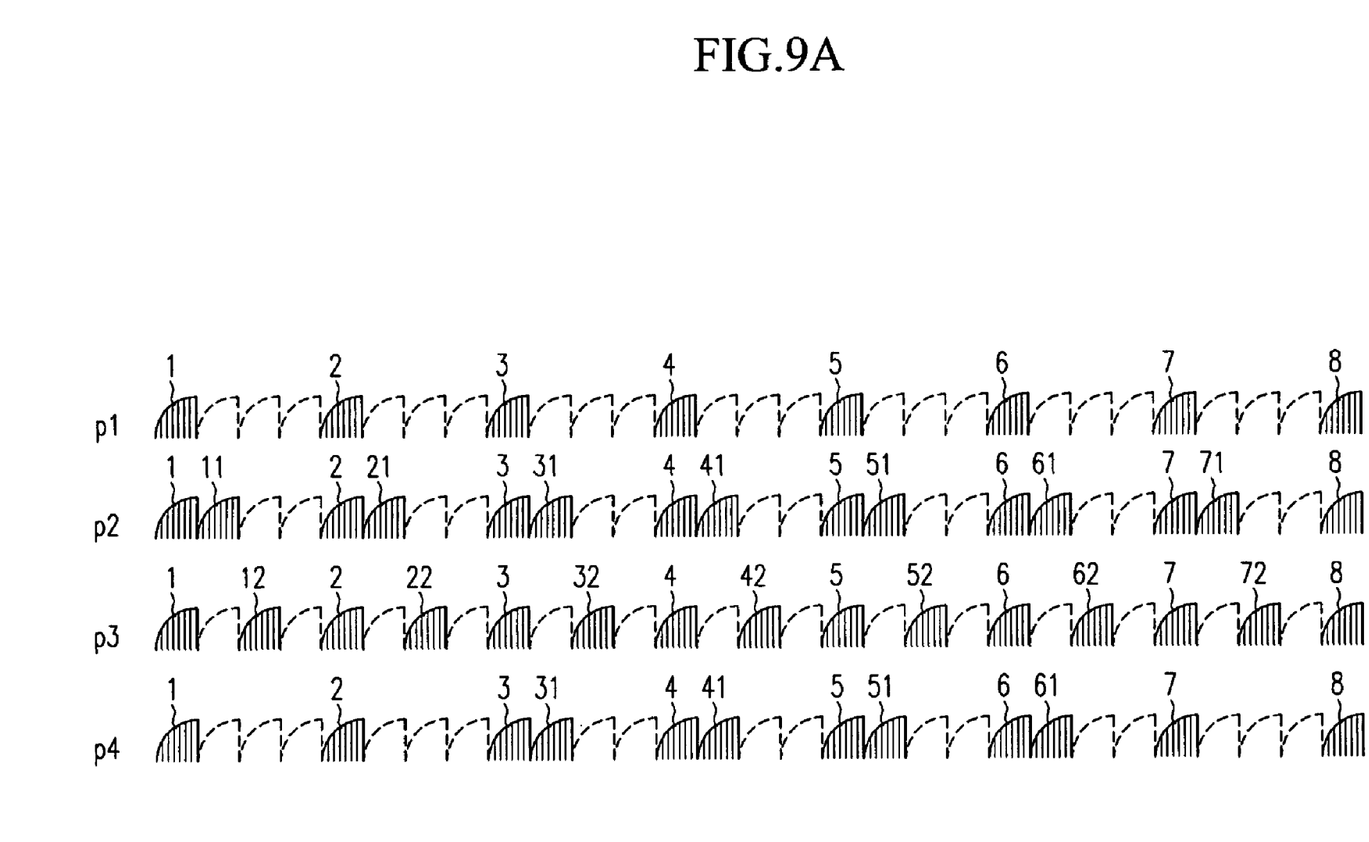
FIG. 9A illustrates various voltage pulses.
Figure 9B:
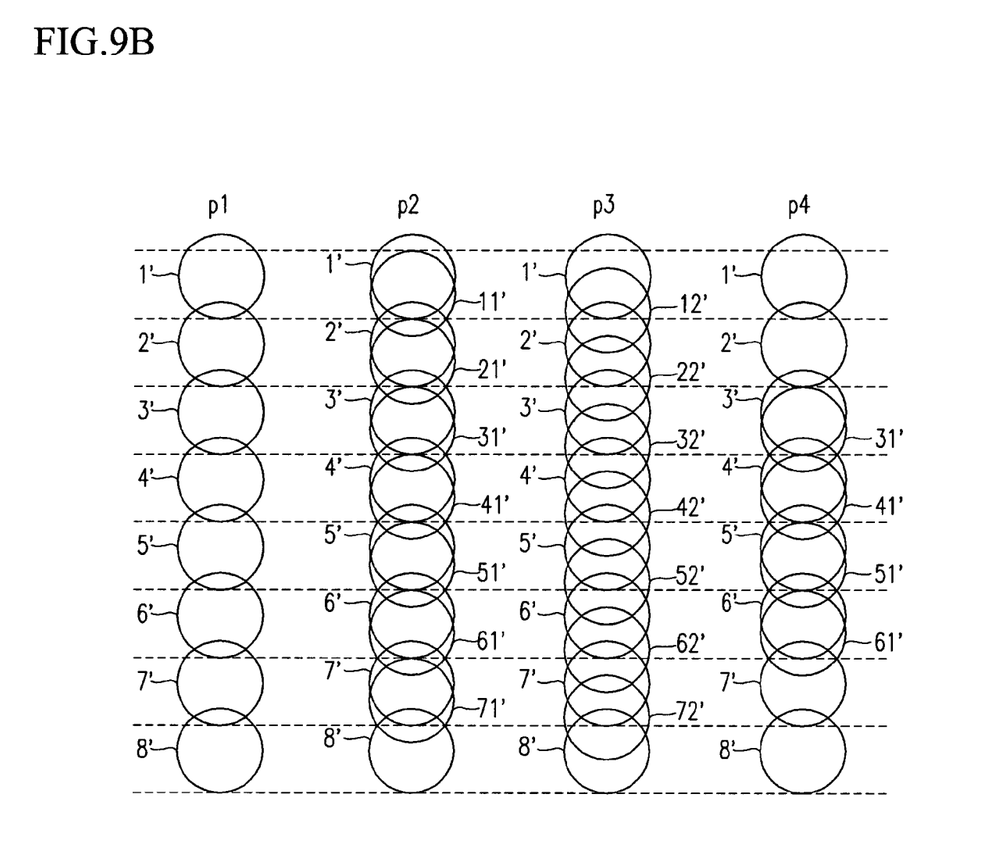
FIG. 9B illustrates drops of alignment liquid deposited according to the voltage pulses shown in FIG. 9A.

FIG. 9A illustrates various voltage pulses, and FIG. 9B illustrates drops of alignment liquid deposited according to the voltage pulses shown in FIG. 9A.

In FIG. 9A, like the first voltage pulse pattern p1, a pulse pattern in which one pulse is generated for a predetermined period is called a standard voltage pattern.

As shown in FIG. 9A, voltage pulses (1-8) are generated at a predetermined period by a standard voltage pulse pattern p1 to be applied to a nozzle hole of the inkjet head 30.

In this case, as shown in FIG. 9B, a plurality of alignment liquid drops 1'-8' are dropped at a regular interval along the same line and are overlapped with adjacent drops.

In the second voltage pulse pattern p2, two voltage pulses are sequentially generated to be applied to a nozzle hole.

Preferably, since an amount of dropped alignment liquid is increased, the second voltage pulse pattern p2 is used to improve the planarization of the alignment layers or increase a thickness of the result alignment layers.

When the moving speed of the printing stage is to be decreased while using the second voltage pulse pattern p2, the overlapped portion between adjacent dropped alignment liquid drops increases.

In the third voltage pulse pattern p3, the pulse generating period of the second voltage pulse pattern p3 is shorter than that of the standard voltage pulse pattern p1. Thus, a pulse generation frequency count in the third voltage pulse pattern p3 is larger than that of the standard voltage pulse pattern p1.

By the third voltage pulse pattern p3, separate pulses 12, 22, 32, 42, 52, 62, and 72 are further generated among the pulses 1-8 generated by the standard voltage pulse pattern p1 to be applied to a nozzle hole. Thus, the number of dropped alignment liquid drops is increased to improve the planarization of the deposited drops.

In addition, the fourth voltage pulse pattern p4 is for increasing the number of voltage pulses generated on a predetermined section. That is, on the section on which the pulses 3-6 are generated, pulses 31, 41, 51, and 61 are further sequentially generated to be applied to a nozzle hole.

Two alignment liquid drops are dropped in successions on the predetermined section by the fourth voltage pulse pattern p4, to improve the planarization of the deposited drops and decrease the amount of consumed alignment liquid.

According to the present invention, since the printing stage is elevated and rotated, the drops of the alignment liquid are deposited in a grid pattern to decrease the space between adjacent drops. Thus, the planarization time of the alignment layers become short.

While the present invention has been described in detail with reference to the preferred embodiments, it is to be understood that the invention is not limited to the disclosed embodiments, but, on the contrary, is intended to cover various modifications and equivalent arrangements included within the spirit and scope of the appended claims.

What is claimed is:

1. An inkjet alignment layer printing method comprising:
depositing drops of an alignment liquid on a substrate while moving a plurality of inkjet heads and the substrate relative to each other to form a first dropping line on the substrate;
rotating a printing stage on which the substrate is mounted by 90 degrees; and
depositing drops of the alignment liquid on the substrate after forming the first dropping line to form a second dropping line perpendicular to the first dropping line and intersecting the first dropping line,
wherein each of the inkjet heads comprises a plurality of nozzle holes; and
wherein forming the first dropping line and forming the second dropping line comprise applying first voltage pulses and second voltage pulses to the nozzle holes for forming the first and second dropping lines, respectively, and skipping the second voltage pulses for portions where the first dropping line intersects the second dropping line.

2. The method of claim 1, wherein a portion of the printing stage is elevated and rotated.

3. The method of claim 1, wherein the second voltage pulses have the same shape as the first voltage pulses for regions on the substrate other than an intersection of the first and second dropping lines.

4. An inkjet alignment layer printing method comprising:
depositing drops of an alignment liquid on a substrate while moving an inkjet head and the substrate relative to each other to form a first dropping line on the substrate,
rotating a printing stage on which the substrate is mounted by 90 degrees after forming the first dropping line;
depositing drops of the alignment liquid on the substrate to form a second dropping line perpendicular to the first dropping line and intersecting the first dropping line, wherein each inkjet head comprises a plurality of nozzle holes to which a voltage pulse is applied, and
generating a predetermined interval between voltage pulses to skip the voltage pulses applied where the first dropping line intersects the second dropping line.

5. The method of claim 4, wherein voltage pulses applied to each nozzle hole have a predetermined period.

6. The method of claim 5, wherein adjacent drops among drops deposited through each nozzle hole overlap each other at a predetermined portion along the same line.

7. The method of claim 5, wherein the number of the voltage pulses is one within the predetermined period.

8. The method of claim 5, wherein the number of the voltage pulses is two within the predetermined period.

9. The method of claim 8, wherein the two voltage pulses are applied in succession.

10. The method of claim 8, wherein the two voltage pulses are applied at a predetermined portion.

* * * * *